Figure 1:
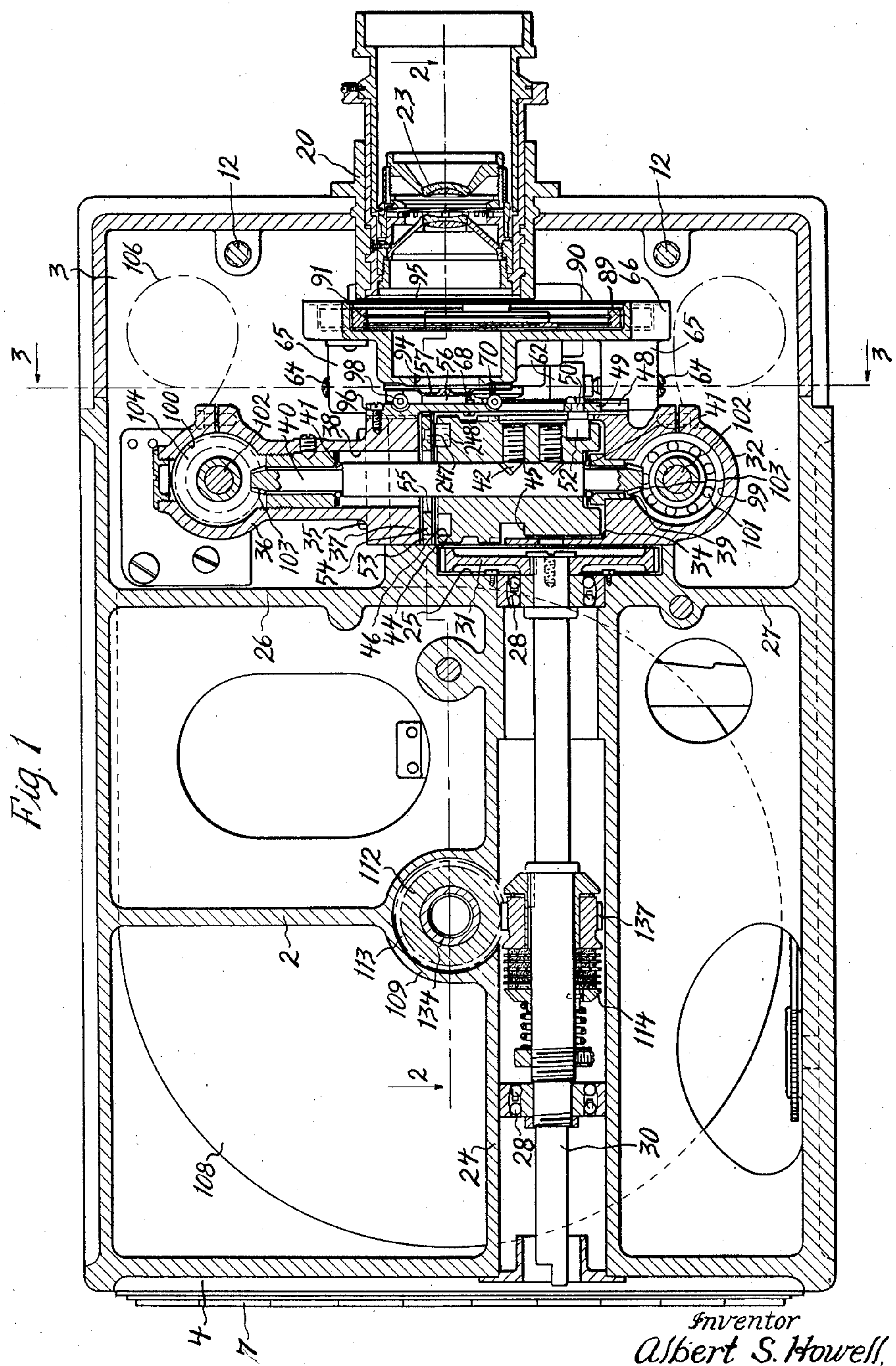

A. S. HOWELL.

ACTUATING MECHANISM FOR MOTION PICTURE CAMERAS AND THE LIKE.

APPLICATION FILED OCT. 11, 1919.

1,417,525. Patented May 30, 1922.

3 SHEETS—SHEET 1.

Inventor

Albert S. Howell.

By Miehle + Miehle.

Attorneys.

A. S. HOWELL.
ACTUATING MECHANISM FOR MOTION PICTURE CAMERAS AND THE LIKE.
APPLICATION FILED OCT. 11, 1919.
1,417,525. Patented May 30, 1922.
3 SHEETS—SHEET 2.
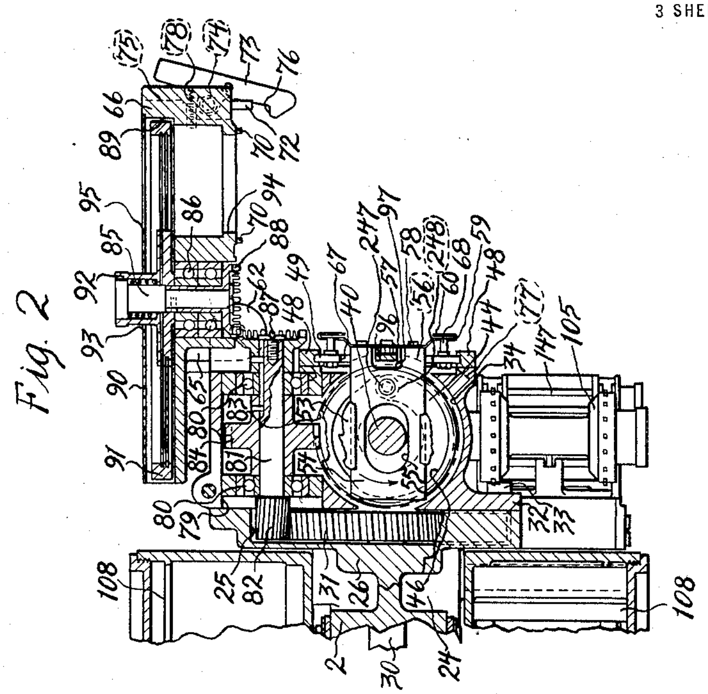
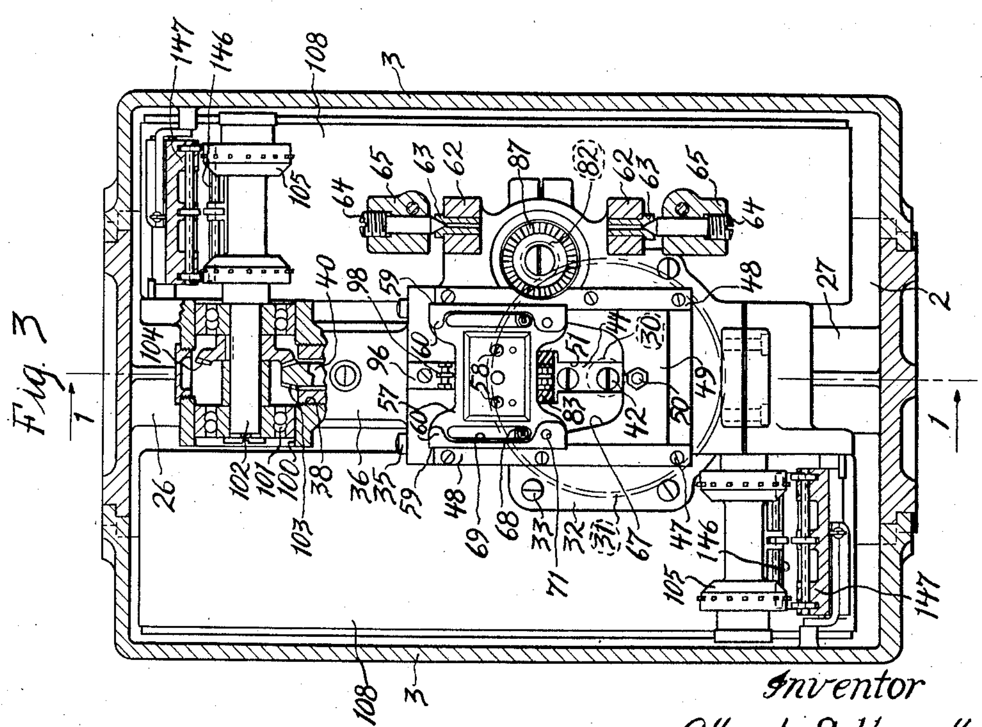
Inventor
Albert S. Howell.
By Miehle & Miehle,
Attorneys.

A. S. HOWELL.
ACTUATING MECHANISM FOR MOTION PICTURE CAMERAS AND THE LIKE.
APPLICATION FILED OCT. 11, 1919.
1,417,525. Patented May 30, 1922.
3 SHEETS—SHEET 3.
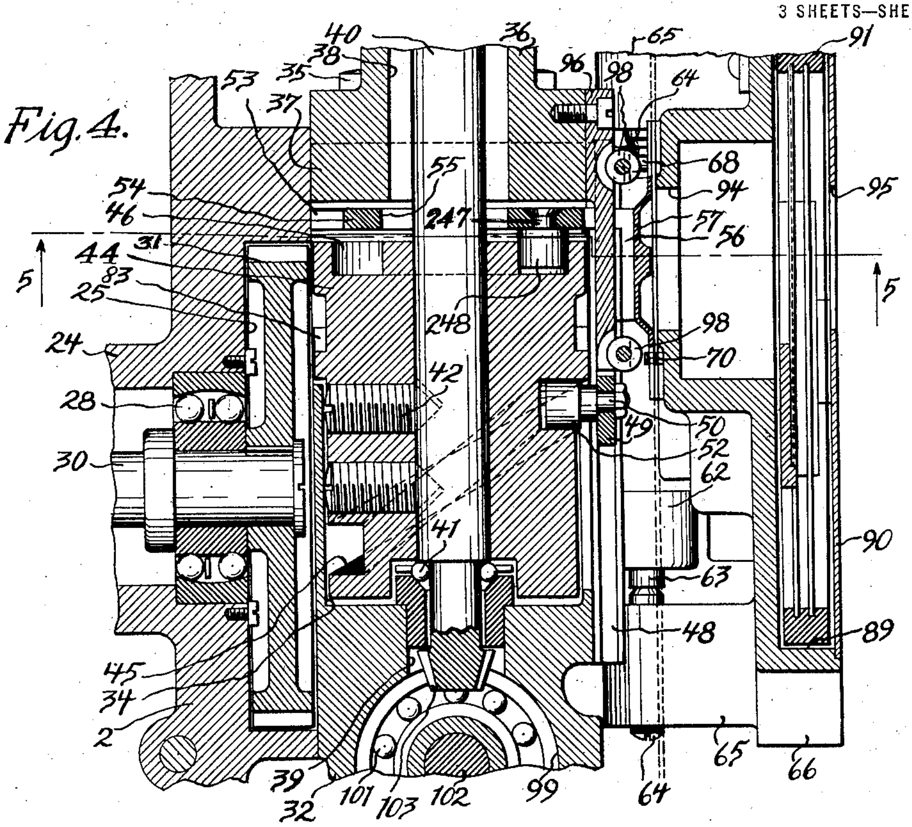
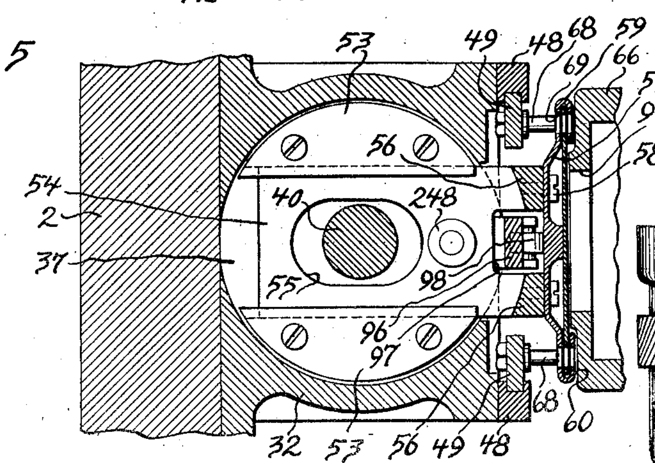
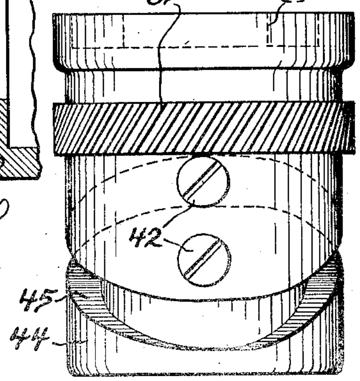
Inventor
Albert S. Howell
By Miehle & Miehle
Attorneys.

UNITED STATES PATENT OFFICE.

ALBERT S. HOWELL, OF CHICAGO, ILLINOIS, ASSIGNOR TO BELL AND HOWELL COMPANY, OF CHICAGO, ILLINOIS, A CORPORATION OF ILLINOIS.

ACTUATING MECHANISM FOR MOTION-PICTURE CAMERAS AND THE LIKE.

1,417,525. Specification of Letters Patent. Patented May 30, 1922.

Orginal application filed April 28, 1919, Serial No. 293,249. Divided and this application filed October 11, 1919. Serial No. 330,143.

*To all whom it may concern:*

Be it known that I, ALBERT S. HOWELL, a citizen of the United States, residing at Chicago, in the county of Cook and State of Illinois, have invented a certain new and useful Improvement in Actuating Mechanism for Motion-Picture Cameras and the like, of which the following is a full, clear, concise, and exact description, reference being had to the accompanying drawings, forming a part of this specification.

My invention relates to actuating mechanism for motion picture cameras and the like and has particular relation to the shutter and film feeding mechanisms thereof.

The features of the present invention relate to the shutter and film feeding mechanism with a view toward compactness, ease of operation, manipulation and accessibility particularly with relation to film threading operations, a relatively small number of operating parts and adaptability thereof to an enclosed film magazine type camera of convenient dimensions, and which is particularly adapted to an enclosed film magazine type of camera described and claimed in U. S. application Serial No. 293,249 filed by me April 28, 1919, for improvement in motion picture cameras and tripods of which the present application is a division.

The above features and certain other features hereinafter appearing are embodied in the preferred form of my invention hereinafter fully described and illustrated in the accompanying drawings, and are effected by certain novel constructions, combinations and arrangements of parts particularly pointed out in the claims.

In the said drawings:—

Fig. 1 is a sectional view in side elevation of a motion picture camera embodying the features of my invention in their preferred form, this view being taken substantially on the line 1—1 of Fig. 3 described below. Fig. 2 is a partial sectional view in plan elevation of the same substantially on the line 2—2 of Fig. 1 with certain of the parts in different positions as hereinafter described. Fig. 3 is a sectional view in front elevation of the same substantially on the line 3—3 of Fig. 1. Fig. 4 is an enlarged fragmentary sectional view on the line 1—1 of Fig. 3, showing the parts in different positions than those in which they are shown in Figs. 1, 2, and 3. Fig. 5 is a fragmentary sectional view taken on the line 5—5 of Fig. 4. Fig. 6 is an enlarged view in side elevation of the cam cylinder hereinafter described.

Like characters of reference indicate like parts in the various views.

The casing of the camera is formed of a central frame 2 and a closure 3 fitted to the central frame on either side thereof to form an enclosure thereabout, the central frame forming the central portion 4 of the rear wall of the camera and the center rearward portions of the upper and lower walls of of the camera while the closures 3 form the front wall and complete the rear, top and bottom walls. The rear wall portions of the closures 3 are pivoted to the rear wall portion of the central frame by means of hinges 7 and are secured in closed position upon the central frame 2 by screws 12. The meeting edges of the frame 2 and closures 3 are stepped correspondingly, and the meeting edges of the front wall portions of the closures 3 are provided with oppositely disposed semi-circular concave portions forming a circular opening in the enclosure when the closures are in closed position. Mounted in this opening is a bush 20 secured to one of the closures and a camera lens 23 of usual construction is carried within the bore thereof, all as fully described and claimed in the aforementioned U. S. application, Serial No. 293,249 filed by me April 28, 1919.

The manner in which the camera lens 23 is carried within the bush 20 is fully described and claimed in U. S. application, Serial No. 330,144, filed by me Oct. 11, 1919, for improvement in camera lens mounts, divided from the aforementioned application.

As above described the central frame 2 is provided with a central rear wall portion 4 and upper and lower wall portions, and extending horizontally from the rear wall portion 4 is a tubular formation 24 spaced from the upper and lower wall portions of the central frame and terminating at its front end in an enlargement in which the bore of the formation is enlarged as indicated at 25, the front end of this formation being supported by ribs 26 and 27 respectively extending between the upper wall portion of the central frame and the formation and the lower wall portion of the central frame and the formation. Mounted for rotation on bearings 28 within the bore of this formation is a horizontal shaft 30, and affixed to the front end of this shaft within the enlarged bore 25 is a relatively large spur gear 31. The front end of the formation is faced in a vertical plane just in front of the gear 31, and a supplemental frame 32 is secured to this face by headed screws 33, see Figs. 2 and 3, and encloses the front end of said enlarged bore 25. This supplemental frame is bored vertically, as indicated at 34, and has a horizontal face at its upper end. See Figs. 1 and 2. Secured to this face of the supplemental frame by means of headed screws 35 is an extension frame 36 having a turned extension 37 at its lower end projecting downwardly into the upper end of the bore 34 and engaging the sides thereof to center the extension frame with said bore. The extension frame 36 is provided with a vertical bore 38 smaller than bore 34 and disposed concentrically thereto, and the bore 34 is restricted at the lower end of the frame 32 to form a small bore 39 disposed concentrically to said bore 34. Extending through bores 34, 38, and 39 is a vertically disposed shaft 40 which is mounted on a bearing 41 disposed adjacent each end of the shaft and supported respectively in bores 38 and 39, the axis of this shaft being normal to the axis of gear 31, and shaft 30, and disposed on one side of the plane of the gear.

Secured upon the shaft by means of set screws 42, screw-threaded into it and engaging respective conical depressions formed in the shaft, is a cam cylinder 44. The lower end of this cam cylinder forms a drum cam having a cam groove 45 and the extreme upper end of this cam cylinder forms a face cam disposed coaxially with the drum cam groove 45 and having a cam groove 46 facing upwardly. See Figs. 2, 3, and 6.

The front side of the supplemental frame 32 is faced in a vertical plane and secured to this face by headed screws 47, see Fig. 3, in parallel spaced relation and extending vertically is a pair of slides 48 having vertical grooves facing each other. A U-shaped shuttle 49, having the legs of the U-shape thereof extending upwardly, is disposed between these slides and has its side edges engaging said grooves to form a slide mounting for the shuttle. Mounted on the shuttle at the transverse portion of the U-shape at the lower end thereof and disposed midway between the slides 48 is a stud 50 which extends inwardly toward shaft 40 through a vertical slot 51 in the supplemental frame 32, and mounted for rotation on the inner end of this stud is a roller 52 which is engaged with the cam groove 45 of the drum cam whereby the shuttle is reciprocated in a vertical path parallel to the axis of the cams as the cams are rotated.

The lower end of the turned extension 37 of the extension frame 36 is disposed some distance above the upper end of the cam cylinder, and secured on the bottom of said extension 37 and entending in a forward and rearward direction is a second pair of slides 53 having horizontal grooves disposed normal to the plane of said shuttle and disposed in parallel spaced relation facing each other. The slides 53 are disposed on either side of the shaft 40, and a slide block 54, having an aperture 55 through which shaft 40 passes, see Figs. 2 and 5, has its side edges engaging said grooves to form a slide mounting for the slide block. A downwardly extending stud 247 is secured to the slide block just forward of the aperture 55, and mounted on this stud is a roller 248 which is engaged in the cam groove 46 whereby the slide block is reciprocated in a horizontal path normal to the path of the shuttle 49. The slide block extends forwardly through an opening in the supplemental frame and the front end thereof is provided with two spaced downwardly extending lugs 56 disposed one at each side of the slide block. Disposed just in front of the shuttle is a register leaf 57 which has its rear broad side secured to said lugs by headed screws 58. This register leaf has one complete broad side, the rear of which is secured to lugs 56, and has parallel edges 59, the edges that are parallel to the path of the shuttle 49, upstanding therefrom to form edge guides for the film, and retaining portions 60 extending from said edges toward each other in spaced relation with said complete broad side and spaced from each other throughout the entire length of the leaf to leave the center portion of this side open whereby a film may be inserted in the register leaf therethrough by bending the film lengthwise to permit the side edges thereof to pass through said opening. This register leaf is fully described and claimed in the aforementioned U. S. application Serial No. 293,249, filed by me April 28, 1919.

Formed on the supplemental frame 32 and extending to one side and in front thereof is a pair of supports 62 disposed in vertical spaced relation with each other. A bush 63 is fitted to each support at the outer end thereof. These bushes are disposed coaxially on a vertical axis and the upper bush has an upwardly facing conical surface and the lower bush has a downwardly facing conical surface, which receive respective conical ends of adjustable bearing screws 64 screw-threaded into and clamped in adjusted position in respective wings 65, disposed respectively above and below the supports 62, of a shutter frame 66 whereby the shutter frame is pivotally mounted for limited swinging movement upon the supplemental frame 32, on an axis parallel to the axis of the cams and disposed to one side of the axis of the cams, which shutter frame, when in closed or functioning position, see Fig. 1, lies transversely just in front of register leaf 57, and which, when open, see Fig. 2, lies longitudinally to one side of said register leaf to allow the film to be inserted into the register leaf as above described and to permit access to the mechanism.

The opening formed by the upright U-shape of the shuttle 49 as designated at 67 allows vertical reciprocal movements thereof without interference with slide block 54 or the support 96 hereinafter described, and mounted, one on each side of the shuttle, at the free ends of the legs thereof are two horizontally spaced shuttle pins 68 projecting forwardly therefrom. When the register leaf is positioned in its rear position these shuttle pins project through respective vertical slots 69 formed in the rear side of the register leaf and engage the usual side perforations in a film held in the register leaf and move the same downwardly with the downward movement of the shuttle. Mounted on the rear side of the shutter frame and projecting rearwardly therefrom and disposed below the lowest position of the shuttle pins 68 is a pair of stationary pilot pins 70 which are spaced in a horizontal plane and adapted, when the shutter frame is in closed position, see Fig. 1, and the register leaf is in its forward position, to project through respective apertures 71 formed in the retaining portions 60 and the rear side of the register leaf to insure the film remaining stationary while the shuttle pins are not in engagement with perforations thereof. In the operation of this step by step mechanism the movements of the shuttle take place in the following order by reason of the timed relation of the cam grooves 45 and 46 which actuate the shuttle 49 and register leaf 57 in reciprocal paths normal to each other as hereinbefore described. Starting in the cycle of operation as shown in Figs. 1, 2 and 3 of the drawings, where the shuttle is at the lower end of its stroke, the register leaf is in its forward position to hold the film in engagement with the stationary pilot pins 70 projecting through apertures 71 to engage the film and hold it stationary. As the cam cylinder 44 turns, in a counter-clockwise direction, see the arrow in Fig. 2, the cam groove 45, acting through means hereinbefore described, moves the shuttle upwardly, perforations of the film being disengaged from the shuttle pins 68 during this movement by reason of the fact that the register leaf 57 is held in its forward position with the film therein forward of the path of said shuttle pins, perforations of the film being engaged with stationary pilot pins 70 when in this position. When the shuttle reaches the upper end of its movement the cam groove 46, acting through means hereinbefore described, moves the register leaf 57 rearwardly to disengage perforations of the film from stationary pilot pins 70 and to engage perforations of the film with shuttle pins 68. Fig. 5 shows the position of the parts just after the shuttle has reached the upper end of its movement and before the register leaf is moved inwardly to engage perforations of the film with pins 68. After perforations of the film have been engaged by the shuttle pins the cam groove 45 moves the shuttle and film downwardly, and after the shuttle has reached the lower end of its movement the register leaf and film are moved forwardly to disengage perforations of the film from shuttle pins 68 and to engage perforations of the film with stationary pilot pins 70 to complete the cycle of operation.

The shutter frame 66 is provided with a spacing stud 72, see Fig. 2, extending from the rear surface thereof to engage the front face of the adjacent slide 48 when the shutter frame is in closed position to position the same. The shutter frame is maintained in its closed position with stud 72 engaging the front face of the adjacent slide by a hook latch lever 73 pivoted on a vertically disposed pin 74 mounted on the shutter frame and disposed within a horizontal slot 75 formed in the shutter frame. This latch lever extends forwardly and rearwardly of the pin 74 and has a hook 76 facing forwardly when the shutter frame is in closed position, which hook engages the rear surface of the adjacent slide 48, at a point where the supplemental frame 32 is cut away, as designated at 77, see Fig. 2, when the shutter frame is in closed position to maintain the stud 72 in engagement with said adjacent slide 48. A coiled compression spring 78 is disposed in a horizontal bore of the shutter frame in front of the pin 74 and abuts the latch lever and the bottom of said bore and normally maintains the latch lever in locked position, see Fig. 2. The front end of the latch lever extends beyond the shutter frame so that it may be conveniently manipulated to move the shutter frame from its closed position.

As hereinbefore described the gear 31 is affixed to the front end of shaft 30 within the enlarged bore 25 enclosed by supplemental frame 32. The supplemental frame 32 is extended laterally at the side from which supports 62 extend and between the same, and a horizontal bore 79 is formed therein, see Fig. 2, parallel with shaft 30 and alongside and communicating with bore 34 of the frame 32 and enlarged bore 25. Disposed within this bore and rotatably supported therein on bearings 80, on an axis parallel with shaft 30 and normal to the axis of the cam cylinder and extending past one side of the cam cylinder between the axis of the cam cylinder and the axis of the shutter frame, is a shaft 81. Formed on the rear end of this shaft and meshing with gear 31 is a relatively small spur gear 82. The cam cylinder has spiral gear teeth 83 formed thereon which mesh with a spiral gear 84 fixedly mounted on shaft 81 between bearings 80 whereby the cam cylinder is driven from shaft 30. A shutter shaft 85 is mounted in bearings 86 within a bore of the rear wall of the shutter frame 66, and is disposed to aline with shaft 81 when the shutter frame is in closed position. Fixedly mounted on the front end of shaft 81 is a forwardly facing crown wheel 87, and fixedly mounted at the rear end of shutter shaft 85 is a rearwardly facing crown wheel 88 having the same number of teeth as the crown wheel 87 and engaged therewith. The pivotal axis of the shutter frame is so disposed with relation to these wheels 87 and 88 that teeth thereof are always meshed in driving relation regardless of the pivotal position of the shutter frame, see Fig. 2. The maintenance of the driving relation between the shutter and cams dispenses with the necessity of the operator recoupling the same in moving the shutter in functioning position, and the arrangement thereof with relation to spiral gear 84 permits this gear remaining stationary with the cams, thus permitting a simple arrangement well adapted for the design of camera illustrated. When the shutter frame is in closed or functioning position all of the teeth of each of these gears are intermeshed.

It is necessary that the shutter shaft 85 make one revolution to each revolution of the cam cylinder 44. The intermeshing spiral gear teeth 83 and spiral gear 84 permit of this without enlarging the mechanism, either by multiplying the parts or separating the present parts to an inconvenient and possibly impractical degree. It will be noted that the pitch diameter of gear 84 is smaller than the pitch diameter of spiral gear teeth 83 whose size is controlled by the size of the cam cylinder 44. Therefore, to effect the present compact arrangement the spiral gear 84 has the same number of teeth as there are spiral gear teeth 83 and the angle of the gear teeth 83 with relation to the axis of the cam cylinder is greater than the angle of the teeth of spiral gear 84 with relation to the axis of shaft 81, in the present case this angle of spiral gear teeth 83 being 57° and the angle of the teeth of spiral gear 84 being 33°.

In the driving train above described, when pictures are being taken, the shaft 30 rotates in a clock-wise direction looking forward, and the shaft 81 rotates oppositely. The angles of spiral gear teeth 83 and spiral gear 84 are so disposed that the shaft 40 and cam cylinder 44 rotate in a counter clockwise direction as before described. The shutter shaft 85 rotates in the same direction as does the shaft 81 by reason of the connection therebetween as hereinbefore described.

The shutter frame 66 has a forwardly facing enlarged bore 89 formed therein concentric with shutter shaft 85, and has a cover 90 secured to the front end thereof enclosing this bore. Mounted on the shutter shaft within this bore is a shutter 91 of the usual adjustable aperture type, the adjustment knob 92 of which extends through a concentric aperture 93 formed in the cover 90. See Fig. 2.

The rear wall of the shutter frame 66 is offset rearwardly in front of register leaf 57 and is provided with a "frame" aperture 94 through which the image is projected on the film in the register leaf and the surrounding edge of this aperture is extended rearwardly to lie within the retaining portions 60 of the register leaf to press the film in the register leaf against the forward face of the rear broad side of the register leaf when the register leaf is in its forward position. The cover 90 has an aperture 95 in alinement with the aperture 94 with relation to lens 23, and light is transmitted through both of these apertures upon the film when the shutter is in exposing position to expose the film in the register leaf.

Secured upon the extension frame 36 is a support 96 extending vertically downwardly therefrom between lugs 56 of slide block 54, and rearwardly of register leaf 57, the slide block being cut away rearwardly between said lugs as indicated at 97, to clear this support in all positions of the slide block. Two rollers 98 are mounted for rotation on this support on a horizontal transverse axis and are disposed one above and one below the center portion of the register leaf, and these rollers are disposed to engage the center of the film when the register leaf is in its rearward position and hold the same forwardly away from the rear broad side of the register leaf when the shuttle is moving the film downwardly in the register leaf to prevent scratching of the film by the register leaf. The cut away portion 67 of the shuttle is formed to clear this support in all positions of the shuttle.

The lower end of the supplemental frame 32 has a transverse horizontal bore 99 formed therein communicating with the lower end of the hereinbefore described bore 39 thereof. The upper end of the extension frame 36 has a transverse horizontal bore 100 formed therein communicating with the upper end of the hereinbefore described bore 38 thereof. Supported for rotation in each of these bores on two spaced bearings 101 is a film sprocket shaft 102 which is disposed normal to the shaft 40. See Figs. 1 and 3. These shafts are disposed transversely of the camera and extend outwardly from their respective frames on opposite sides of shaft 40, the upper shaft 102 extending to the right from shaft 40 above the step by step mechanism and the lower shaft 102 extending to the left from shaft 40 below the step by step mechanism. See Fig. 3. A bevel gear pinion 103 is formed at each end of the shaft 40, and each of these pinions meshes with a bevel gear 104 fixed upon the adjacent shaft 102 and disposed between the respective bearings 101. These bevel gear connections are so arranged that the shafts 102 rotate in the same direction, counter-clockwise in Fig. 1. A film sprocket 105 is fixed on the extending ends of each shaft 102 in the usual manner, and in the operation of the machine the film passes over the upper film sprocket 105 in front of which it makes a downward spiral right hand loop, after which it passes downwardly through register leaf 57, and below this makes a second right hand loop and passes under the lower film sprocket 105 as indicated by the dot and dash line 106 in Fig. 1.

Disposed one on each side of the tubular formation 24 of frame 2 and shaft 30 at the rear of the respective film sprockets 105 and disposed in parallelism with each other is a pair of film magazines 108 the axes of which are coaxial.. The axes of these film magazines are disposed in parallelism with said film sprockets and are coaxial with a transverse tubular formation 109 disposed above the tubular formation 24 and shaft 30 and normal thereto. The usual film spools, not shown, in the magazines are driven from shaft 30 by a frictionally driven take-up mechanism which includes a concentrically bored gear sleeve 112 provided at its periphery with spiral gear teeth 113, a clutch sleeve 134 mounted in the bore of said gear sleeve, a spiral gear 137 meshing with gear teeth 113 and rotatably supported on shaft 30 and a friction clutch device 114 providing a frictional connection between shaft 30 and gear 137, see Fig. 1. This portion of the mechanism needs no further description for the present purpose except that it is adapted to drive the film spool of the left hand magazine in Fig. 3 in a direction, clockwise in Fig. 1 to wind film fed thereon from lower film sprocket 105 when the operating parts are actuated in a forward direction to take pictures as hereinabove described, and that it is adapted to drive the film spool of the right hand film magazine, in Fig. 3, in a direction counter-clockwise in Fig. 1 to wind film fed thereon from upper film sprocket 105 when the operating parts are actuated in a reverse direction as is desirable at times in the operation of the machine.

The shape of the magazines in a plane normal to their axes is defined by three quarters of a circle and two oppositely extending tangents thereof meeting at an angle of 90°, see Fig. 1, and the vertically disposed tangential side portion of each film magazine 108 is provided with a film opening 146, which film openings are disposed in alinement with the respective film sprockets 105, see Fig. 3. A film guide device 147 is provided for each film sprocket and serves, when in closed position, to maintain the film in engagement with the respective film sprocket and to guide the film to and from the respective film opening 146. These film guide devices are mounted upon extensions of the supplemental frames 32 and 36 respectively and require no further description for the present purposes, and are fully described and claimed in the aforementioned U. S. application, Serial No. 293,249, filed by me April 28, 1919.

From the above it will be noted that the moving of the shutter to and from its closed or operating position is a very simple operation and that the driving devices of the same do not require attention in this operation, and that when it is moved into closed position it is not necessary to time the same with the film feed mechanism nor is it necessary to operate the mechanism to bring automatic devices into play to time the shutter with the film feeding mechanism. And it will be noted further that the arrangement of the driving device of the film feeding mechanism is very compact and consists of a relatively small number of parts, and that the mechanism is well adapted to an enclosed film magazine type of camera.

The film feeding mechanism herein described as unrelated to the shutter is fully described and claimed in U. S. application Serial No. 330,032, filed by me Oct. 11, 1919, for improvement in film feeding mechanism for motion picture cameras and the like divided from the aforementioned U. S. application, Serial No. 293,249, filed by me April 28, 1919.

While I have herein described and shown the preferred embodiment of my invention I do not wish to be limited to the precise details of construction shown as changes may readily be made without departing from the spirit of my invention, but having thus described my invention I claim as new and desire to secure by Letters Patent the following:

1. A device of the nature described including a rotatably mounted spur gear, step by step mechanism including a rotatably mounted cam disposed on an axis disposed on one side of the plane of said gear and normal to the axis thereof, a driving connection between said gear and said cam including a spur gear meshing with said first mentioned gear and disposed on an axis parallel to the axis of said first mentioned gear and extending past one side of the axis of said cam and a spiral gearing connection between said second mentioned gear and said cam including a spiral gear disposed on an axis coincident with that of said second mentioned gear, a rotatably mounted shutter disposed on the side of said cam opposite said first mentioned gear and disposed on an axis coincident with said second mentioned gear, and a driving connection between said first mentioned driving connection and said shutter to rotate the same in unison with said cam.

2. A device of the nature described including a rotatably mounted spur gear, step by step mechanism including rotatably mounted coaxial cams disposed on an axis disposed on one side of the plane of said gear and normal to the axis thereof, a rotatably mounted shaft disposed on an axis parallel with the axis of said gear and extending past one side of the axis of said cams, a spur gear on said shaft meshing with said first mentioned gear, a spiral gearing connection between said shaft and said cams including a spiral gear mounted on said shaft, a rotatably mounted shutter disposed on the side of said cams opposite said first mentioned gear and disposed on an axis coincident with that of said shaft, and a driving connection between said shaft and shutter.

3. A device of the nature described including support means, step by step mechanism including coaxial cams rotatably mounted on said support means, a shaft rotatably mounted on said support means and disposed on an axis normal to the axis of said cams and extending past the axis of said cams on one side thereof, a spiral gear connection betwen said shaft and said cams including a spiral gear fixed on said shaft, a shutter support mounted for movement relatively to said support means out of and into shutter functioning position, a shutter rotatably mounted on said shutter support and disposed thereon to be positioned with the axis thereof coincident with the axis of said shaft when the shutter support is in shutter functioning position, and a driving connection between said shaft and said shutter including interengaged coupling members adapted to permit movement of said shutter with the shutter support out of and into functioning position without breaking driving relation between said shaft and shutter.

4. A device of the nature described including support means, step by step mechanism including a cam rotatively mounted on said support means, a shutter support mounted for pivotal movement relatively to said support means out of and into shutter functioning position on an axis parallel to the axis of said cam and disposed to one side thereof, a shutter rotatably mounted on said shutter support on an axis normal to the axis of movement of the shutter support and disposed to extend between the axes of said cam and shutter support when the shutter frame is in shutter functioning position, and a driving connection between said cam and shutter including a spiral gear rotatably mounted on said support means on an axis coincident with the axis of said shutter when the shutter support is in shutter functioning position and engaged crown wheels having the same number of teeth adapted to maintain driving connection between said spiral gear and said shutter in all pivotal positions of the shutter support in its movement out of and into shutter functioning position.

5. A device of the nature described including support means, a spur gear rotatably mounted thereon, step by step mechanism and including a cam rotatably mounted on said support means and disposed on an axis disposed on one side of the plane of said gear and normal to the axis thereof, a driving connection between said gear and said cam, said driving connection being mounted on said support means and including a rotatably mounted spur gear meshing with said first mentioned gear and disposed on an axis parallel with the axis of said first mentioned gear and extending to one side of the axis of said cams and a spiral gearing connection between said second mentioned gear and said cams including a rotating spiral gear disposed coaxially with said second gear and rotatively fixed therewith, a shutter support mounted for movement relatively to said support means out of and into shutter functioning position, a shutter rotatably mounted on said shutter support and disposed to be positioned on the side of said cam opposite said first mentioned gear on an axis coaxial with said second mentioned spur gear when the shutter support is in shutter functioning position, and a driving connection between said first mentioned driving connection and said shutter including complementary coupling members adapted to permit movement of said shutter with the shutter support out of and into shutter functioning position.

6. A device of the nature described including support means, a spur gear rotatably mounted thereon, step by step mechanism mounted on said support means and including rotatably mounted coaxial cams disposed on one side of the plane of said gear on an axis normal thereto, a shaft rotatably mounted on said support means and disposed on an axis parallel to the axis of said gear and extending past the axis of said cams on one side thereof, a spur gear on said shaft and fixed to rotate therewith and meshing with said first mentioned spur gear, a spiral gearing connection between said shaft and said cams including a spiral gear on said shaft and fixed to rotate therewith, a shutter support mounted for pivotal movement relatively to said support means out of and into shutter functioning position on an axis normal to the axis of said shaft and disposed at the side thereof opposite the axis of said coaxial cams, a shutter rotatably mounted on said shutter support on an axis disposed coaxial with said shaft when said shutter support is in shutter functioning position, and a driving connection between said shutter and said shaft including engaging crown wheels having the same number of teeth and adapted to maintain driving connection between said spiral gear and said shutter in all pivotal positions of the shutter support in its movement out of and into shutter functioning position.

7. A device of the nature described including a frame forming an enclosure, step by step mechanism including a cam rotatably mounted on said frame and disposed within the enclosure thereof, a shutter support disposed without the enclosure of said frame and mounted for movement relatively to said frame out of and into shutter functioning position, a shutter rotatably mounted on said shutter support and disposed on an axis normal to the axis of said cam and extending past one side of the axis of said cam when the shutter support is in shutter functioning position, and a driving connection between said cam and said shutter including a spiral gear rotatably mounted within the enclosure of said frame on an axis coincident with the axis of said shutter when the shutter support is in shutter functioning position and complementary coupling members between said spiral gear and said shutter adapted to permit movement of said shutter with the shutter support out of and into shutter functioning position.

8. A device of the nature described including a frame forming an enclosure, a shutter support disposed without the enclosure of said frame and pivotally mounted thereon for movement out of and into shutter functioning position, step by step mechanism including coaxial cams rotatably mounted on said frame and disposed within the enclosure thereof and stationary pilot pins mounted on the shutter frame and disposed to function when said shutter support is in shutter functioning position, a shutter rotatably mounted on said shutter support and disposed on an axis normal to the axis of said cams and extending past one side of the axis of said cams when the shutter support is in shutter functioning position, and a driving connection between said cams and said shutter including a spiral gear rotatably mounted within the enclosure of said frame on an axis coincident with the axis of said shutter when the shutter support is in shutter functioning position and engaged crown wheels, having the same number of teeth and adapted to maintain driving connection between said spiral gear and the shutter in all pivotal positions of the shutter support in its movement out of and into shutter functioning position.

9. A device of the character described including a frame provided with a horizontal bore; a shaft rotatably mounted in said bore, said bore being enlarged at one end; a gear disposed within said enlarged bore and affixed to said shaft; a supplemental frame secured to said first mentioned frame at the enlarged bore end thereof and enclosing said enlarged bore, said supplemental frame being bored; step by step mechanism including coaxial cams rotatably mounted in the bore of said supplemental frame on an axis disposed normal to said shaft; a rotatory connection between said gear and said cams including a second gear meshing with said first mentioned gear, and spiral gearing; a shutter mechanism; and a rotatory connection between said shutter mechanism and said first mentioned rotatory connection.

In witness whereof I hereunto affix my signature this ninth day of October, A. D. 1919.

ALBERT S. HOWELL.